United States Patent
Jonasson et al.

(12) 
(10) Patent No.: US 6,534,138 B1
(45) Date of Patent: Mar. 18, 2003

(54) PACKING MATERIAL WITH HIGH PRINTABILITY AND RECYCLABILITY, AND METHOD FOR ITS PRODUCTION

(75) Inventors: Alf Jonasson, Bor (SE); Jeff Thornton, Al Huizen (NL)

(73) Assignee: SCA Packaging Marketing NV, Zaventen (BE)

( * ) Notice: Subject to any disclaimer, the term of this patent is extended or adjusted under 35 U.S.C. 154(b) by 0 days.

(21) Appl. No.: 09/719,521
(22) PCT Filed: Jun. 16, 1999
(86) PCT No.: PCT/SE99/01071
§ 371 (c)(1), (2), (4) Date: Mar. 6, 2001
(87) PCT Pub. No.: WO00/00408
PCT Pub. Date: Jan. 6, 2000

(30) Foreign Application Priority Data

Jun. 17, 1998 (SE) .............................................. 9802172

(51) Int. Cl.[7] .............................................. B29D 22/00
(52) U.S. Cl. .................... 428/35.5; 428/35.6; 428/36.3; 428/36.4; 428/532; 428/536; 428/537.5; 427/171; 427/206; 427/208.6; 427/324; 427/364; 427/394; 427/414; 427/415
(58) Field of Search .................... 428/532, 536, 428/537.5, 35.6, 36.5, 36.3, 36.4; 427/171, 206, 208.6, 324, 364, 394, 415, 414

(56) References Cited

U.S. PATENT DOCUMENTS

| 5,035,930 A | 7/1991 | Lacourse et al. .......... 428/35.6 |
| 5,736,586 A | * 4/1998 | Bostioli ...................... 521/84.1 |

FOREIGN PATENT DOCUMENTS

| EP | 375831 | | 7/1990 |
| EP | 636612 | * | 2/1996 |
| EP | 696612 | | 2/1996 |
| WO | 9405492 | * | 3/1994 |
| WO | 9612606 | | 2/1996 |

* cited by examiner

Primary Examiner—Leszek Kiliman
(74) Attorney, Agent, or Firm—Burns, Doane, Swecker & Mathis

(57) ABSTRACT

The invention pertains to a method for the manufacture of a packaging material (1; 21) for the production of packaging blanks and packages and comprising the steps of providing at least on surface layer (2, 2'; 22, 22') in the form of a continuous material web and substantially consisting of cellulosic fibres and applying a distance layer (3; 23) comprising a matrix material and reinforcement fibres thereto so that said surface layer (2, 2'; 22, 22') is bonded to said distance layer (3; 23). The matrix material in the distance layer (3; 23) is in an expandable state when it is applied to the surface layer (2, 2'; 22, 22') and is expanded in a separate process step, subsequent to the application step. The invention also concerns expandable packaging materials.

17 Claims, 1 Drawing Sheet

PACKING MATERIAL WITH HIGH PRINTABILITY AND RECYCLABILITY, AND METHOD FOR ITS PRODUCTION

TECHNICAL FIELD

The present invention pertains to a packaging material with high printability and recyclability. The invention further relates to a method for producing such a packaging material.

The herein utilized expressions "recyclability" and "recyclable raw materials" pertains to both material and energy recovery, such as the re-use of raw materials included in the packaging material when producing new packaging material, biological recovery of nutritious substances included in the packaging material by means of composing, energy recovery when combusting the packaging material, and the like.

Before or in connection with the use of the packaging material according to the invention in a package, a distance layer, included in the packaging material and comprising a matrix material and reinforcement fibres of cellulose, is expanded, wherein both the matrix material and the reinforcement fibres of cellulose are based on renewable and recyclable raw materials. Before the expansion, the distance layer has been applied onto and bonded to one or several surface layers which comprise cellulose fibres.

The surface layer(s) of the packaging material according to the invention provide(s) one or several smooth external surfaces with high printability. Furthermore, the packaging material according to the invention can, in a simple way, be re-used as a raw material for new packaging material. The packaging material according to the invention is intended to replace corrugated board and other packaging materials with similar fields of application. The packaging material according to the invention can, for example, be utilized in boxes or in protective, sheet-shaped wrappings, and also in applications with higher demands on printability than what is normal for conventional corrugated board.

BACKGROUND OF THE INVENTION

Corrugated board is a long ago well-known packaging material and provides a number of significant advantages, such as low weight, high stiffness, recyclability and a proportionately low price.

The manufacture of corrugated board starts from liner and fluting. Thereby, liner refers to a paper grade with high tensile and tear resistance, which is intended to constitute surface layers in the finished corrugated board. Liner is preferably manufactured from unbleached sulphate pulp of softwood, but recently there has been a changeover to the utilization of recycled fibres, originating from corrugated board, as a raw material in so-called testliner.

Furthermore, with a view to improve the printability, the manufacture of multi-layered liner has been initiated, wherein the layer of the liner which is intended to be visible in a finished corrugated container is constituted of bleached chemical pulp and/or contains a filler with high brightness. As a rule, such liner is called "white top liner".

The fluting is the undulating paper layer in corrugated board and has the task of providing the finished corrugated board with high stiffness and bulk, preferably by means of creating distance between the liner layers being part of the corrugated board. Fluting is generally manufactured from semi-chemical pulp, for example neutral sulphite pulp (NSSC).

There are corrugated board grades which have one single liner layer, which by means of a suitable adhesive has been attached to an undulating fluting layer in a corrugated board machine intended for this purpose.

However, it is occurring more frequently that two liner layers have been attached onto each side of an undulating fluting layer, or that the corrugated board consists of larger number of alternating liner and fluting layers, for example in the sequence liner/fluting/liner/fluting/liner. Thereby, the number of layers is determined, amongst other things, by the durability which is required from the finished corrugated container.

When manufacturing corrugated board, a frequently occurring chemical additive is different forms of starch or starch derivatives. Such an addition of starch can, for instance, be utilized as a dry strength agent in the liner production, or as an adhesive when converting liner and fluting into corrugated board.

The gradually increasing demand on resource economy and recycling have resulted in that corrugated board waste, and waste paper containing corrugated board, today can be recycled without any problems worth mentioning, as long as the main components included are cellulose fibres and starch and the starch content does not become too high. Certain synthetic adhesives, plastic layers, plastic particles and other additives in packaging materials, however, can render the recycling difficult and lead to disturbances in the production. Therefore, it is desirable that the recycled raw material which is re-used, for example in liner production, does not contain large amounts of such unwanted components, and that the content of starch or starch derivatives in relation to the content of cellulose fibre is not too high.

In connection with this, it may be mentioned that also other "natural" polymers, having similar properties as starch, can function well for recycling in a production process for liner, fluting or other raw material for packaging material. There are a number of such "natural" polymers, which are based on renewable raw materials and which, in principle, can be recovered in a corresponding way as starch, as long as the content of "natural" polymer in the process does not become too high. Examples of such "natural" polymers, which in this context usually can be placed on an equal footing with starch, are carboxy-methyl cellulose (CMC), alginate, casein, animal glue, polylactides (PLA), pentosanes, chitin and other polymers which have been manufactured from natural, in the short term renewable, non-fossil raw materials.

It has preciously been suggested to produce packaging material out of expanded starch. Accordingly, the patent publication U.S. Pat. No. 5,035,930 discloses a biodegradable shaped product comprising an expanded starch, having a high amylose content of at least 45%. The expanded product is claimed to have a low density, a closed cell structure, and to be compressible. In U.S. Pat. No. 5,035,930, the use of the expanded starch material in a biodegradable packaging material, such as an insert or a loose fill, is also disclosed.

Furthermore, the patent publication EP 0 696 612 A2 discloses biodegradable foamed articles and a process for their preparation. The foamed articles are claimed to have a density between 5 and 300 kg/m$^3$ and are obtained by means of agglomerating foamed particles having a composition comprising a themoplastic starchy material or a thermoplastic natural polymer capable of absorbing water when converted into the thermoplastic state, a thermoplastic polymer and water. The task of the thermoplastic polymer is claimed to be to improve the strength of melted composition, and to obtain foamed particles with high elasticity and low moisture sensitivity. In EP 0 696 612 A2, if is also disclosed that sandwich structures easily can be formed by means of bonding one or several sheets or panels which have been obtained by means of agglomeration of foamed particles, and that the biodegradable sheets or panels can be joined together with paper sheets, cardboard sheets or a film or a sheet of a biodegradable plastic material or of a conventional plastic material. Furthermore, its is disclosed that cellulose fibres can be included in such sheets or panels together with the foamed particles, WO 94/05492 discloses a laminate comprising hardened starch which is bound to another material. The laminate is obtained by extruding a suspension of expanded starch between two outer layers.

Something which might be perceived as a disadvantage with conventional corrugated board is that the undulating fluting layer is attached to the liner only at its wave crests. This often results in problems with so-called "washboarding effects". This Implies that the external surface of the corrugated board, i.e. the liner, assumes a washboard-like structure with wave crests and wave troughs. This results in a heavily impaired printablity and, amongst other things, implies that printing of corrugated board hitherto in general has been limited to comparatively simple flexographic printing techniques. Previously known packaging materials of expanded starch, without any surface layers of paper, can only be printed with the use of special printing techniques. Furthermore, the recovery of such packaging materials into raw material for new packaging material can exhibit certain difficulties, and restrict the disposal possibilities to composting or waste incineration.

Problems with uneven outer surfaces and unsatisfactory printability can arise also when packaging materials comprising foamed starch particles are concerned, which particles have been formed into panels or sheets in a preexpanded condition and which thereafter, by means of laminating, have been provided with surface layers of paper. The reason for this is that the expanded starch particles, having a density/hardness being different from the binder which keeps such a panel or sheet together, easily can create irregularities in an external surface layer of paper and result in an impaired printability. Furthermore, the recycling of such materials can offer some difficulties because of the proportionately large number of included chemical components, which also may comprise chemical compounds which are based on undesired, non-renewable, fossil raw materials.

SUMMARY OF THE INVENTION

Accordingly, a first object of the present invention is to provide a method for the manufacture of a packaging material which eliminate the abovementioned problems with the prior art, and which provides at least one external surface with high printability and which, furthermore, provides high recyclability into raw material for renewed production of packaging material.

Another object of the invention is to provide a packaging material which is produced in accordance with the method. A further object of the invention is to offer a packaging material which reduces transport and storage costs and which increases the options when converting the material into packaging blanks, or packages.

In accordance with the following claim 1, this objects of the invention are achieved by means of a method for the manufacture of a packaging material for the production of packaging blanks and packages and comprising providing at least one surface layer in the form of a continuous material web and substantially comprising of cellulosic fibres and applying a distance layer thereto, said distance layer comprising a matrix material and cellulosic reinforcement fibres, so that said surface layer is bond to said distance layer. The method is characterised in that the matrix material in the distance layer exists in an expandable form during application thereof to the surface layer and in that the matrix material is expanded in a separate process step, subsequent to the application step.

A packaging material in accordance with the invention and comprising at least one surface layer substantially consisting of cellulosic fibres and at least one distance layer, wnerein said distance laye comprises a matrix material and reinforcement fibres, preferably cellulosic reinforcement fibres, and wherein said distance layer is bonded to said surface layer is primarily charaterised in that the matrix material in the distance layer is in an expandable state.

It is advantageous if both the matrix material and the reinforcement fibres are based on renewable and recyclable starting materials. In accordance with the invention, the matrix material in the distance layer is in an expandable state and the distance layer is an even, continuous layer which is bonded to the surface layer with the multiplicity of bonding spots which are substantially continuously distributed in the plane of the packaging material, between the distance layer and the surface layer so that an even outer surface exhibiting high printability is created on the surface layer. Furthermore, in accordance with the invention, the amount of matrix material, cellulosic fibres in the packaging material and the strength of the bonding spots when the material is in a completely wet state are adapted in order to allow for reclaiming raw material for renewed production of the packaging material.

In order to achieve the objects of the present invention, the type of matrix material based on renewable and recyclable raw material, which is used in the distance layer, is in principle irrelevant as long as the obtained packaging material is able to fulfil the features which are defined in the following claims. Accordingly, the utilized matrix material has to be expandable, applicable as an even, continuous layer, and enable recycling of the packaging material. Consequently, the utilized matrix material has to contain some form of expansion agent, for example water, a chemical compound which emits gas when heated, or the like.

The application of the distance layer can take place with any suitable type of equipment having the ability to form and apply a distance layer comprising matrix material and reinforcement fibres of cellulose, as long as the applied distance layer fulfils the requirements which are made according to the invention.

A distance layer for use in the packaging material according to the invention, for example, can be formed and applied analogous to previously known extrusion technique for starch, wherein the starch is brought into a thermoplastic state in an extruder and is formed into a web-shaped distance layer which is applied onto a surface layer or between two surface layers, for example of liner. Thereby, the distance layer can be expanded in connection with the extrusion by means of water, included in the starch structure, which because of the high temperature during the extrusion forms expanding water vapour, or the expansion can take place by means of another suitable expansion agent and/or in a process stage subsequent to the forming/application.

Accordingly, the expansion of the distance layer can take place with any preciously known technique, and can for example comprise heat supply, another suitable energy supply, or another previously known activating agent for expansion.

A major advantage offered by the invention is that it is possible to product packaging material in the form of continuous webs and subsequently, independently of the production of the packaging material, convert the packaging material into packaging blanks and finished packages. Due to the fact that the packaging material in accordance with the invention is expandable after lamination of the distance layer or distance layers to the surface layer or surface layers, the packaging material can be transported and stored in roll form. Conversion into packaging blanks and finished packages can subsequently be made by a packaging manufacturer who is then able to freely decide the degree of expansion of the material and the shape and size of the individual packaging blanks/packages. Accordingly, the invention offers unique possibilities of flexibility in the conversion steps.

The cellulose fibres in the surface layer(s) can be of any suitable type, but are preferably of the type which is used in conventional production of corrugated board. The surface layer(s) can also be white top liner, testliner or another suitable paper grade, such as cardboard.

Furthermore, the reinforcement fibres of cellulose can be of any type, based on renewable and recyclable raw material, but are advantageously the same type of fibres as the cellulose fibres in the surface layer(s). When forming the distance layer, suitable means for adding the reinforcement fibres of cellulose to the matrix material has to be provided before the forming.

BRIEF DESCRIPTION OF THE DRAWINGS

In the following, the invention will be illustrated with reference to the attached drawings, wherein.

Figure 1:
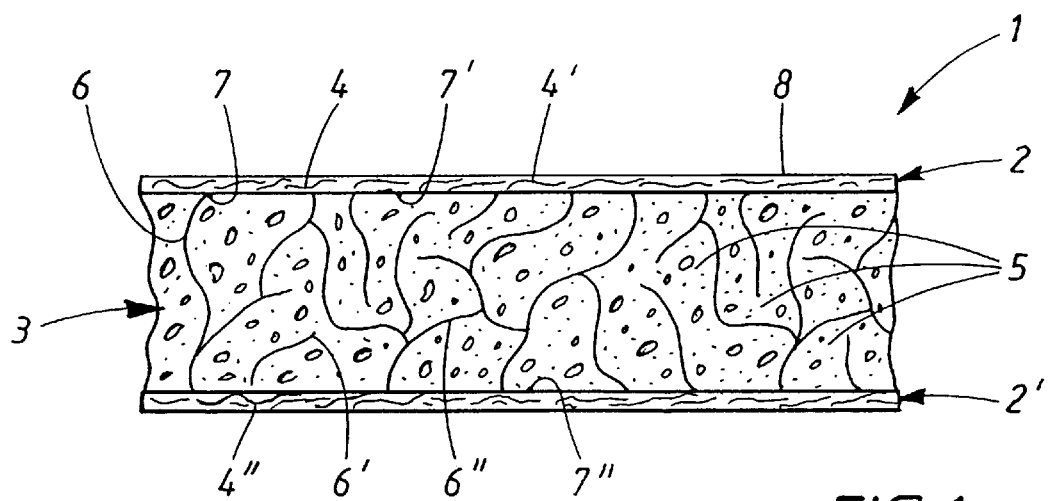
FIG. 1 shows a schematic cross-section of a preferred embodiment of a packaging material according to the invention, with the distance layer in an expanded condition, and FIG. 2 schematically illustrates a preferred embodiment of a method according to the invention.
Figure 2:
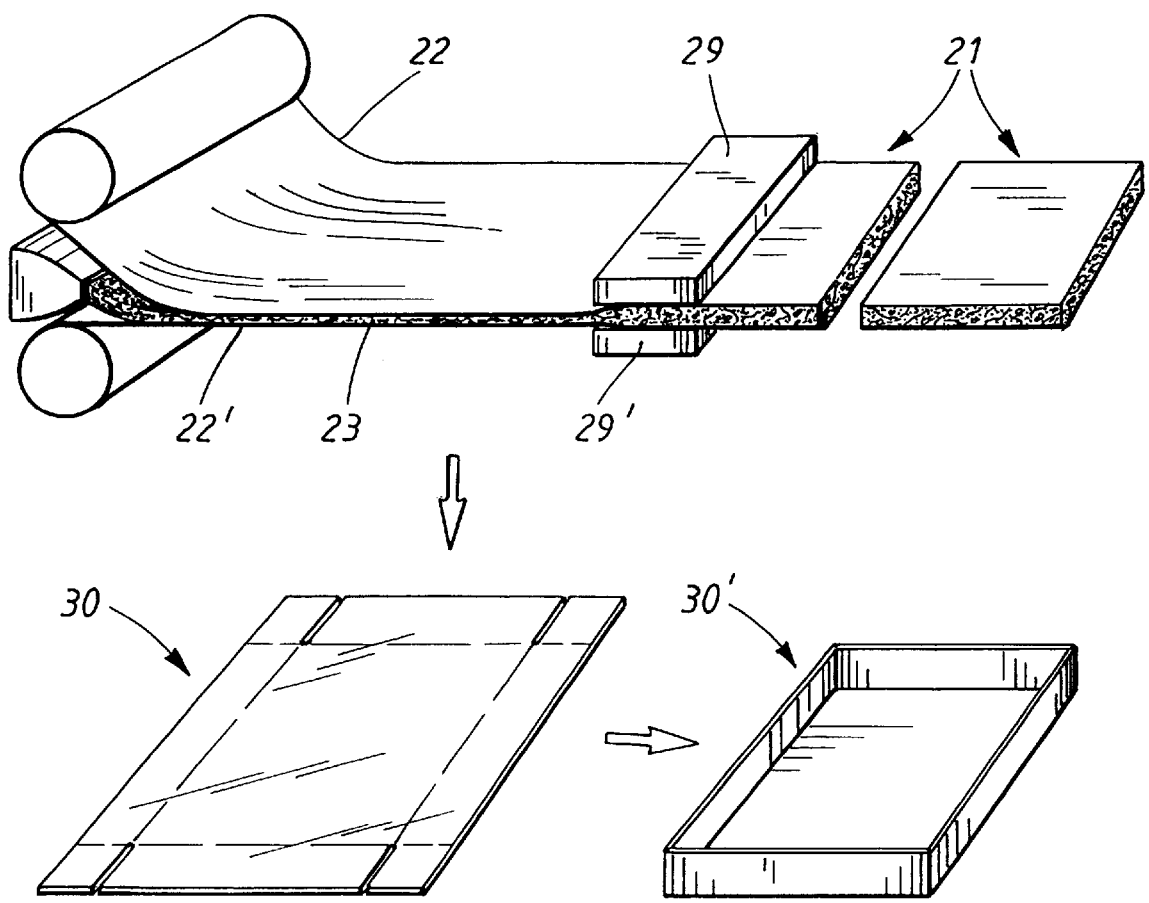

In connection with the attached drawings, it should be noted that the thickness of the packaging material according to the invention and the different included material layers is not made to scale in the schematic FIGS. 1 and 2, but has been magnified in some of the figures in order to make it possible to illustrate the invention more clearly.

DETAILED DESCRIPTION OF PREFERRED EMBODIMENTS

In the following, with reference to the attached FIGS. 1 and 2, a number of different embodiments of the present invention will be described.

In first preferred embodiment of a packaging material according to the invention (FIG. 1), the packaging material 1 comprises two surface layers 2, 2' and an interjacent distance layer 3.

The two surface layers 2, 2', which primarily consist of cellulose fibres 4, 4', 4", are in the described embodiment conventional kraftliner with a basis weight of 150 g/m². However, it is also conceivable with embodiments of the invention with only one surface layer, or embodiments with surface layers having a higher or lower basis weight than 150 g/m². Furthermore, it is conceivable with embodiments of the invention wherein the surface layer(s) consist(s) of another paper grade than liner, for example cardboard or the like.

The distance layer 3 comprises a matrix material 5 and reinforcement fibres of cellulose 6, 6', 6", which both are based on renewable and recyclable raw materials. In the described embodiment, the matrix material 5 is an expanded amylose starch, whereas the reinforcement fibres of cellulose consist of conventional unbleached sulphate pulp which has been mixed into the amylose starch, set into a thermoplastic state, in connection with the extrusion of the distance layer 3 between the two surface layers 2, 2'. It is of course also conceivable with embodiments of the invention wherein the distance layer is applied onto the surface layers with another suitable, previously known, technique than extrusion.

The two surface layers 2, 2' are bonded to the interjacent distance layer 3 by means of bonding points 7, 7', 7", which in the first embodiment can be said to comprise a combination of thermal bonds and paper bonds, also called hydrogen bonds.

In the first embodiment, the matrix material, i.e. The amylose starch 5 of the distance layer 3, has been expanded in the packaging material 1 between the two surface layers 2, 2'. According to the invention, and the first embodiment, the distance layer 3 is an even, continuous layer, wherein the above-mentioned bonding points 7, 7', 7" extend essentially continuously in the plane of the packaging material 1 between the distance layer 3 and the respective surface layer 2, 2'. As a whole, this enables a smooth external surface 8, with high printability, to be obtained on the surface layers 2, 2'.

According to the invention, and the first embodiment, the contents of matrix material 5, cellulose fibres 4, 4', 4" and reinforcement fibres of cellulose 6, 6', 6" in the packaging material 1, and the resistance of the bonding points 7, 7', 7" when in a completely wet condition, are adapted in order to enable recycling of raw material for renewed production of packaging material. In the first embodiment, this has been achieved by means of the amylose starch, utilized as a matrix material 5, being comparatively easily dissolvable in warm water. Furthermore, in the first embodiment, the content of reinforcement fibres of cellulose 6, 6', 6" amounts to about 50 weight-% of the distance layer 3, which guarantees that a sufficient number of the bonding points 7, 7', 7" are hydrogen bonds which easily can be dissolved in water in connection with the recycling. However, it is also conceivable with other contents of reinforcement fibres of cellulose 6, 6', 6", or embodiments wherein wet strength resin or the like is added to the surface layers 2, 2' or to the distance layer 3 in order to increase the moisture resistance of the packaging material according to the invention. In such cases, the content of wet strength agent must be accurately adapted in order not to render the recycling difficult, or alternatively should wet strength resin of the type which can be dissolved in warm water or at a high pH be used.

In a particularly advantageous embodiment of the invention, the matrix material 5 has been manufactured from one or several raw material chosen from the group native starch, modified starch, cellulose derivatives (e.g. carboxymethyl cellulose (CMC)), alginate, casein, animal glue, polylactides (PLA), pentosanes, chitin or other polymer which has been manufactured from natural, in the short term renewable raw materials.

In another embodiment of the invention, the packaging material 1 comprises both a first 2 and a second surface layer 2' on each side of the distance layer 3. In this embodiment, a proportion of the reinforcement fibres of cellulose 6, 6', 6" unites the distance layer 3 with the first 2 and second 2' surface layers by means of hydrogen bonds 7 amongst the bonding points 7, 7', 7". In this embodiment, the paper bonds 7 (hydrogen bonds) contribute to high stiffness and load-bearing ability of the packaging material 1 when this is in an essentially dry condition, since the hydrogen bonds 7 join the reinforcement fibres of cellulose 6, 6', 6" to the surface layers 2, 2', and to each other, in order to form a reinforcement netting, which in the described embodiment, in principle, unites the two surface layers 2, 2'. In this embodiment, the content of reinforcement fibres of cellulose 6, 6', 6" should be at least 40 weight-% of the total weight of the distance layer 3 in order to provide a sufficient quantity of said hydrogen bonds 7 so that, furthermore, recycling of the packaging material 1 in a completely wet condition is facilitated, thanks to the in water easily eliminated hydrogen bonds 7.

In still another embodiment of the packaging material according to the invention, the contents of cellulose fibres 4, 4', 4" and reinforcement fibres of cellulose 6, 6', 6" are together higher than 50 weight-% in the packaging material 1. This enables the packaging material 1 to be recycled in a simple way in order to, with an addition of further cellulose fibres, constitute raw material in renewed production of material for the surface layers 2, 2', which in the described embodiment are of liner. In this embodiment, the high total content of cellulose fibres in the packaging material ensures that no problems arise in connection with the recycling and production of, for instance, new liner.

In one advantageous embodiment of the packaging material, the edge crush resistance of the packaging material 1 is essentially equivalent in all directions in the plane of the packaging material 1, when the distance layer 3 has been expanded. This enables a larger flexibility when designing and manufacturing packages/containers, since no special consideration has to be made with regard to different strength properties of the packaging material 1 in the machine and cross directions. The packaging material 1 according to this embodiment can be achieved by means of selecting surface layers 2, 2' with low intrinsic anisotrophy and by, in addition, accurately controlling the conditions during the extrusion (application) of the distance layer 3.

According to still another embodiment of the packaging material according to the invention (see FIG. 2), the distance layer 3 has been expanded with the packaging material 1 placed between two surfaces with a defined distance between each other, so that the thickness of the packaging material 1 has reached a predetermined value which is adapted to the type of package blank or package in which the packaging material 1 is to be used. This embodiment also provides further possibilities to control other properties of the packaging material according to the invention, such as different strength properties and density.

According to another advantageous embodiment of the packaging material according to the invention, the distance layer 3 is in a non-expanded but expandable condition when the packaging material 1 is delivered to a user of packages (package user). In such cases, the distance layer 3 is intended to be expanded by the package user in a therefore intended, suitable device which, for instance, can comprise two heated surfaces (similar to the ones shown in FIG. 2 with the reference numerals 29, 29'), by means of which the expansion takes place to the desired thickness. This embodiment is of great value for minimizing the transport volumes, between a manufacturer of packaging material 1 or package blanks according to the invention and a user or filler of packages.

In still another embodiment of the packaging material according to the invention, the distance layer 3 has been applied onto one or several surface layers 2, 2' by the manufacturer of packaging material 1, and the distance layer 3 has been expanded in a separate process after the application. This embodiment provides advantages, for example by means of the manufacturer of packaging material being able to "convert" several different grades of the packaging material with different thicknesses, starting from a single, non-expanded grade.

In another embodiment of the packaging material according to the invention, the distance layer 3 has been applied onto the surface layer(s) 2, 2' and expanded already before the packaging material 1 is delivered to the package user. This embodiment can provide advantages when smaller package users are concerned, which for different reasons want to obtain a package blank or a package which is almost in a condition ready for filling.

In still another embodiment of the packaging material according to the invention, the distance layer 3 has not been expanded until after the packaging material 1 has been converted into a package. This embodiment of the packaging materials 1 can provide advantages such as minimization of the storage volume when storing package blanks, or a possibility to achieve for example packages of box-type having an enhanced stability, since the expansion takes place after the folding into a box, something which results in a locking of the folds.

In the following, a number of embodiments of the method according to the invention will be illustrated with reference to the attached FIG. 2.

In the attached FIG. 2, application of one distance layer 23 between two surface layers 22, 22' is illustrated, but it is also conceivable with embodiments of the invention wherein a distance layer is applied onto and bonded to a single surface layer, or embodiments wherein several distance layers, simultaneously or in several steps, are applied onto and bonded to several surface layers, for example in the sequence surface layer/distance layer/surface layer/distance layer/surface layer.

According to a first preferred embodiment of the invention, the method comprises to provide at least on surface layer 22, 22' which primarily consists of cellulose fibres, and to apply a distance layer 23 comprising a matrix material and reinforcement fibres of cellulose thereon, so that the surface layer(s) 22, 22' is/are bonded to the distance layer 23 by means of bonding points. Thereby, both the matrix material and the reinforcement fibres of cellulose are based on renewable and recyclable raw materials.

According to the invention, and the first embodiment of the method, the distance layer 23 is applied in the form of an even, continuous layer on the surface layer(s) 22, 22', so that the bonding points are developed essentially continuously in the plane of the packaging material 21 between the distance layer 23 and the surface layer(s) 22, 22'. Furthermore, the contents of matrix material, cellulose fibres and reinforcement fibres of cellulose in the packaging material 21, and the resistance of the bonding points when in a completely wet condition, are adapted in order to enable recycling of raw material for renewed production of packaging material 21, wherein the matrix material of the distance layer 23 is present in an expandable form or is expanded in the packaging material 21 in connection with the application.

In a particularly advantageous embodiment of the method according to the invention, the surface layer or surface layers 22, 22' is/are present in the form of one or several continuous material webs, onto which the distance layer 23 is applied in order to not be expanded until afterward in a separate, subsequent step in order to provide the packaging material 21. This embodiment provides a number of advantages, such as a more simple production process with fewer process parameters which have to be controlled at the same time. Furthermore, a non-expanded semi-manufacture of the packaging material can be obtained, something which e.g. can provide advantages in the form of reduced storage volumes, and that different grades of the packaging material can be produced from one single semi-manufactured product.

In another advantageous embodiment of the method according to the invention, the matrix material is produced from one or several raw materials chosen from the group native starch, modified starch, cellulose derivatives (e.g. carboxy-methyl cellulose (CMC)), alginate, casein, animal glue, polylactides (PLA), pentosanes, chitin or other polymer which has been manufactured from natural, in the short term renewable raw materials.

In still another advantageous embodiment of the method according to the invention, the distance layer 23 is applied between and bonded to a first 22 and a second surface layer 22'. According to this embodiment, hydrogen bonds are formed between the first surface layer 22 and the distance layer 23 and the second surface layer 22' and the distance layer 23 in connection with the application, by means of the above-mentioned reinforcement fibres of cellulose, wherein the paper bonds contribute to high stiffness and load-bearing ability of the packaging material 21 in an essentially dry condition. Furthermore, a sufficient quantity of the hydrogen bonds is provided in order to facilitate recycling of the packaging material 21 in a completely wet condition, something which is achieved by means of the content of the reinforcement fibres of cellulose being at least 40 weight-% of the total weight of the distance layer 23.

In another embodiment of the method according to the invention, the above-mentioned cellulose fibres and reinforcement fibres of cellulose are provided in contents which together are higher than 50 weight-% in the packaging material 21. This enables the packaging material 21 to be recycled in a simple and nonproblematic way in order to, together with additional cellulose fibres, constitute raw material in renewed production of material for the surface layers 22, 22'.

In still another embodiment of the method according to the invention, the distance layer 23 us expanded so that the edge crush resistance of the packaging material 21 thereafter becomes equivalent in all directions of the plane of the packaging material 21, This us achieved by means of selecting surface layers 22, 22' with low intrinsic anisotrophy and, in addition, by carefully controlling the conditions during the extrusion of the distance layer 23.

According to another embodiment of the method according to the invention, the distance layer 23 is expanded with the packaging material 21 placed between two surfaces 29, 29', With a defined distance between each other. In the described embodiment, the surfaces 29, 29' consist of two heated plates which, except from providing a thickness-limiting function, by means of their high temperature also are able to activate the expansion agent being included in the applied distance layer 23. According to this embodiment, the thickness of the packaging material 21 can be controlled so that it reaches a predetermined value, which is adapted to the type of package blank 30 or package 30' in which the packaging material 21 is to be used. It is also conceivable with embodiments of the invention wherein the two surfaces 29, 29' only provides a thickness-limiting function, and the expansion agent is activated in connection with the application of the distanced layer 23, or by means of another separate supply of energy, or another activating agent which is able to activate the expansion agent. Furthermore, the two thickness-limiting surfaces are advantageously provided in the form of surfaces on a pair of rotating cylinders or the like.

In still another embodiment of the method according to the invention, the packaging material 21 is delivered with the distance layer 23 in a non-expanded but expandable condition to a package user, whereafter the distance layer 23 is expanded by the package user.

In another alternative embodiment, the distance layer 23 is applied onto the surface layer(s) 22, 22' by a manufacturer of the packaging material, whereafter the distance layer is expanded in a separate process after the application.

In still another embodiment of the method according to the invention, the distance layer 23 is applied onto the surface layer 22, 22' and is expanded already before the packaging material 21 is delivered to the package user.

According to an alternative embodiment of the method according to the invention, the distance layer 23 is not expanded until after the packaging material 21 has been converted into a finished package 30'. This embodiment, of course, requires special equipment, for example equipment for activating the expansion agent being included in the distance layer 23 by means of heat supply or the like.

In the foregoing, the invention has been described by means of a number of different embodiments and with reference to the attached drawings. However, it has to be understood that the invention in no way should be regarded as being limited to what has been disclosed above, but that but that its scope is defined by the following claims.

Accordingly it is also conceivable with embodiments of the invention where several sheets of expandable or expanded packaging material according to the invention are laminated together into a suitable number of layers.

What is claimed is:

1. A method of manufacturing of a packaging material for the production of packaging blanks and packages and comprising the steps of: providing at least one surface layer in the form of a continuous material web substantially consisting of cellulosic fibres; applying a distance layer thereto, said distance layer comprising a matrix material and reinforcement fibres so that said surface layer is bound to said distance layer, wherein the matrix material in the distance layer exists in an expandable form during application thereof to the surface layer; and expanding the matrix material in a separate process step subsequent to the applying step.

2. A method in accordance with claim 1, wherein the matrix material has been manufactured from one or several raw materials chosen from the group native starch, modified starch, cellulose derivatives, alginate, casein, animal glue, polylactides (PLA), pentosanes, chitin or other polymer which has been manufactured from natural, in the short term renewable raw materials.

3. A method according to claim 1, wherein the reinforcement fibres are cellulosic reinforcement fibres and that the cellulosic fibres in the surface layer and the cellulosic reinforcement fibres are provided in amounts which together constitute more than 50 weight-% of the packaging material.

4. A method according to claim 1, wherein the distance layer is expanded and that the edge crush strength of the packaging material thereafter becomes essentially equivalent in all directions in the plane of said packaging material.

5. A method according to claim 1, wherein the distance layer is applied between and bonded to a first and a second surface layer.

6. A method in accordance with claim 1, wherein the distance layer is expanded so that the thickness of the packaging material reaches a predetermined value.

7. A method according to claim 1, wherein the distance layer is expanded after the packaging material has been converted into a finished package.

8. A method according to claim 1, wherein the matrix material comprises starch in a thermoplastic state before the expanding step.

9. A packaging material comprising at least one surface layer and at least one distance layer, wherein said surface layer primarily consists of cellulose fibres and said distance layer comprises a matrix material and reinforcement fibres and wherein said surface layer is bonded to said distance layer, wherein the packaging material is manufactured according to the method in claim 1 and wherein the matrix material of the distance layer is expandable.

10. A packaging material according to claim 9, wherein the matrix material has been manufactured from one or several raw materials chosen from the group native starch, modified starch, cellulose derivatives, alginate, casein, animal glue, polylacfides (PLA), pentosanes, chitin or other polymer which has been manufactured from natural, in the short term renewable raw materials.

11. A packaging material in accordance with claim 9, wherein the reinforcement fibres are cellulosic reinforcement fibres and that the amount of said cellulosic fibres and said cellulosic reinforcement fibres together is higher than 50% by weight of the packaging material.

12. A packaging material according to claim 9, wherein the edge crush strength of the packaging material is essentially equivalent in all directions in the plane of said packaging material when the distance layer has been expanded.

13. A packaging material in accordance with claim 9, wherein the distance layer is bonded to a first and a second surface layer.

14. A packaging material in accordance with claim 9, wherein the matrix material comprises starch which has been in a thermoplastic state.

15. A method as claimed in claim 1, wherein the matrix material is in a non-expanded state during application of the distance layer to the surface layer.

16. A packaging material as claimed in claim 9, wherein the matrix material is in a non-expanded state during application of the distance layer to the surface layer.

17. A method as claimed in claim 1, comprising forming the distance layer prior to applying the distance layer to the surface layer.

* * * * *